Sept. 25, 1945.   W. T. TEAGLE   2,385,740
MACHINE FOR PLANTING POTATOES
Filed July 2, 1942   5 Sheets-Sheet 4
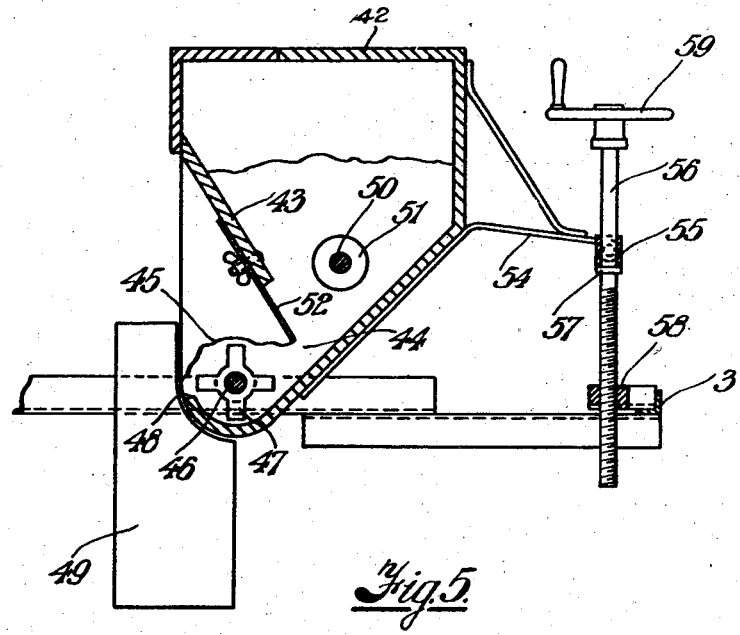
Fig. 5.
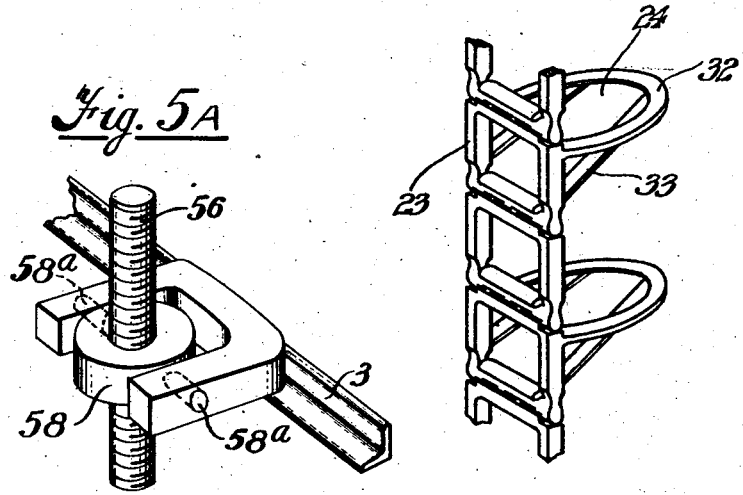
Fig. 5A.
Fig. 4.
INVENTOR
William Thomas Teagle
By Ravair & Bateman
ATTORNEYS

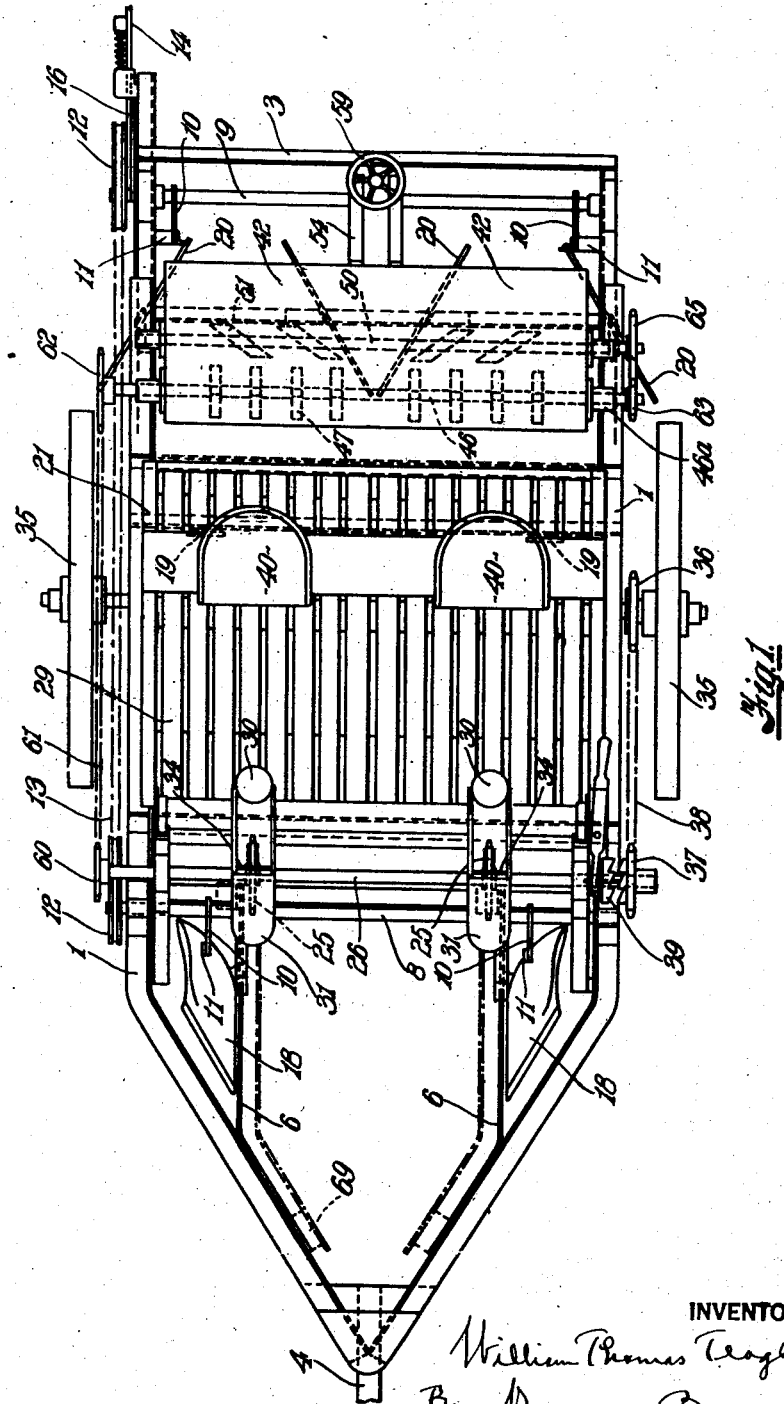

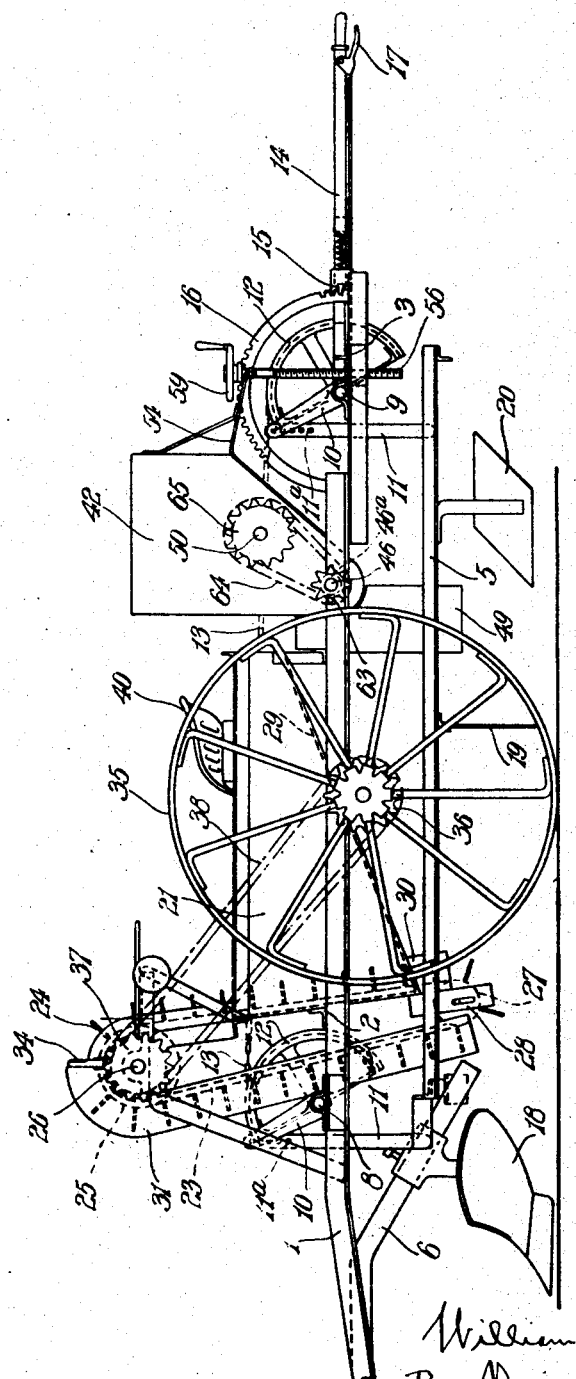

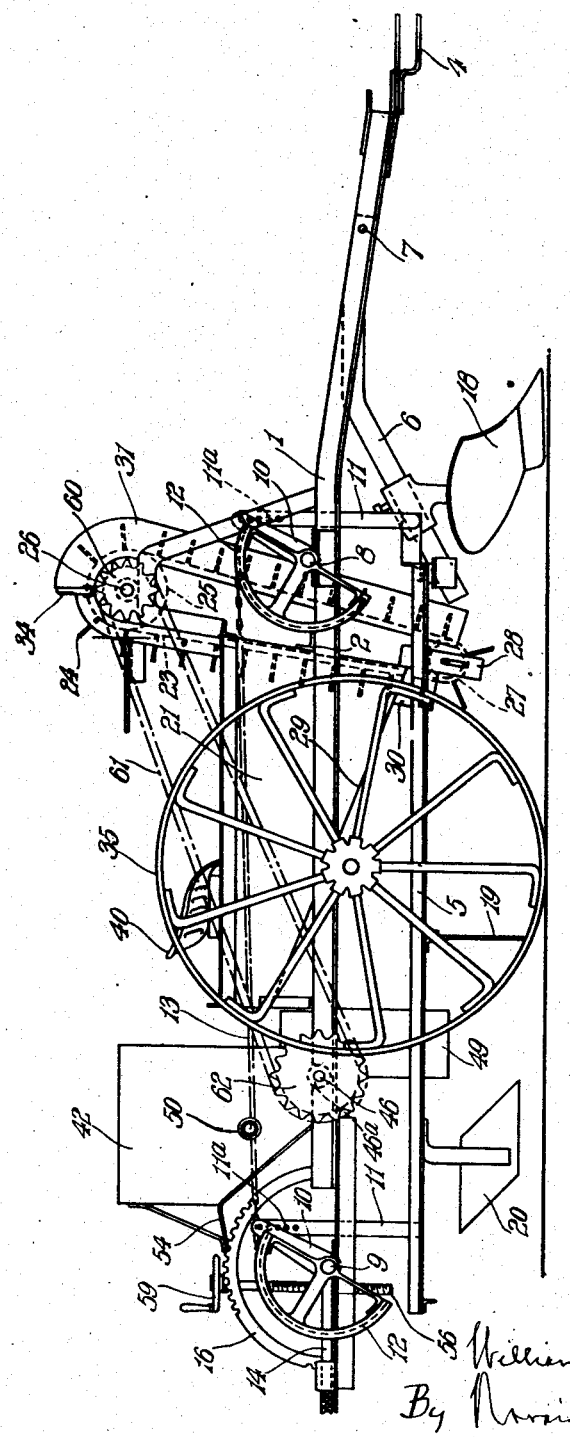

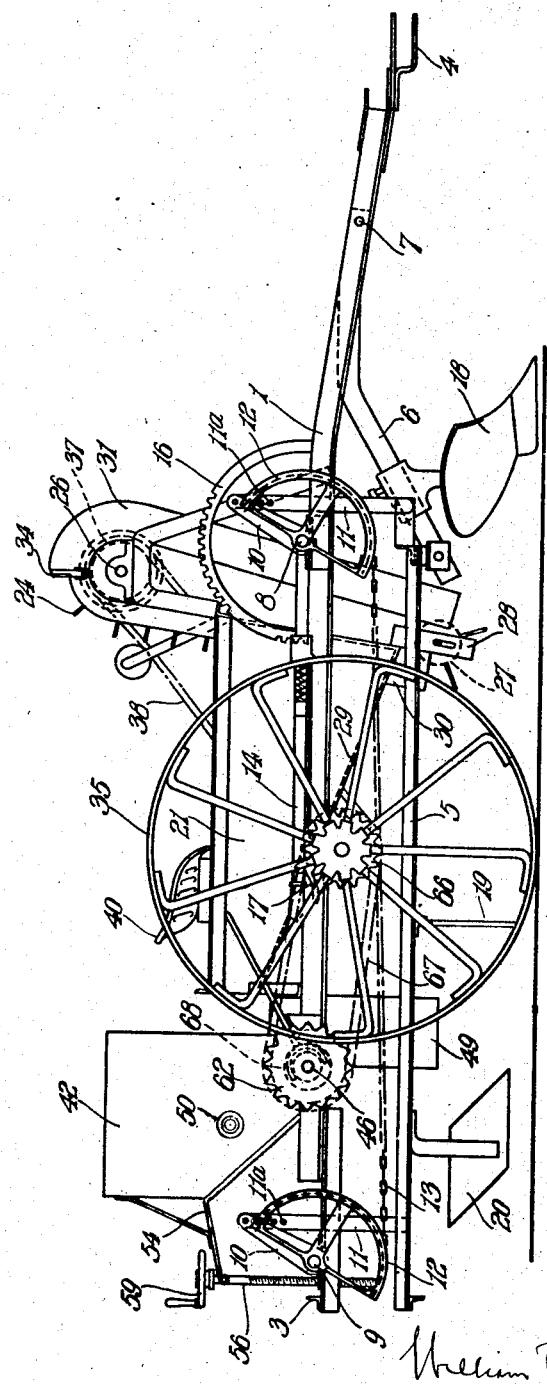

Patented Sept. 25, 1945

2,385,740

UNITED STATES PATENT OFFICE 2,385,740

MACHINE FOR PLANTING POTATOES

William Thomas Teagle, Blackwater, St. Agnes, England

Application July 2, 1942, Serial No. 449,482
In Great Britain April 28, 1941

4 Claims. (Cl. 111—52)

This invention relates to machines for planting potatoes, and more especially to those of the class comprising a drill opening share, a potato hopper, an endless conveyor driven from the ground wheels and adapted to remove potatoes from the hopper and deposit them singly in the drill, and a further share for closing the drill upon the sown potatoes, and has for its object to provide an improved construction of this class capable of carrying out automatically all the operations incidental to forming furrows, planting potatoes, laying fertilizer or manure and covering with earth while being drawn by animal or motor power.

According to the invention the improved machine comprises a wheeled framework, a banker frame movable vertically in said framework under hand control and carrying a share for opening a drill or furrow, a hopper carried by said framework, an endless conveyor adapted to raise potatoes from said hopper and convey them down a tubular chute to deliver them singly to the drill or furrow, a blade or blades also carried by the banker frame for closing the drill or furrow and operating means driven from the ground wheels of said framework.

Reference will now be made to the accompanying drawings which show two embodiments of the invention and wherein:

Fig. 1 is a plan view of the first form of machine,

Fig. 2 is an elevation viewed from one side of the machine,

Fig. 3 is an elevation viewed from the other side of the machine,

Fig. 4 is a detail view to an enlarged scale showing the construction of the potato conveyors, Fig. 5 is an enlarged sectional view through the fertilizer box and distributor and Fig. 5ª is a detail perspective view of part of the adjusting means for said box, and Fig. 6 is a view similar to Fig. 3 but showing an alternative construction.

Referring first to Figs. 1-5, which illustrate a machine constructed to plant two rows of potatoes simultaneously, there is provided a girder fabricated steel frame or chassis consisting of two side members 1 connected towards the front and at the rear ends by cross braces 2, 3 respectively and having extended front end portions curved inwardly and connected together and to a coupling 4 formed for attachment to a towing vehicle.

Supported beneath the chassis is a rectangular banker frame 5 constructed of angle iron girders and carrying the drill opening and closing blades, said frame being so mounted that it may be raised and lowered relatively to the ground. For this purpose the frame is hingedly attached at its front end to the lower ends of a pair of spaced, downwardly-inclined bars 6 pivoted at 7 to the front end portions of the chassis members 1. Also mounted on the chassis at the front and rear ends respectively is a pair of transverse shafts 8, 9, said shafts carrying lever arms 10 which are connected to the banker frame by depending links 11 drilled as at 11a for adjustment purposes. On each shaft is mounted a sector 12, the two sectors being connected by a chain 13 so that the two shafts turn in unison. Also secured to the rear shaft 9 is a hand lever 14 carrying a spring-loaded pin 15 which co-operates with a toothed segment 16 mounted on the chassis member 1 to lock the hand lever in any set position, said pin being under control of a pistol grip 17.

At the front end of the banker frame there is situated two drill opening shares or blades 18, these shares being clamped to the bars 6 as shown, or being fixed direct on the front end of the banker frame, and in either case the mounting being such that the angle of penetration may be varied. At approximately its mid point the banker frame carries two adjustable skimming blades 19 which are adapted to split back a part of the turned earth in order to provide a light covering of the planted potatoes, previously sown by means hereafter to be described, preparatory to the placing of fertilizer or manure in the drills. On the rear end of the banker frame there are mounted three adjustable furrow closing blades 20 which complete the splitting back of the drills or furrows after the fertilizer has been sown.

Mounted within the chassis is a potato hopper 21 from which the potatoes are distributed in the drills by two conveyors. These conveyors each comprise an endless chain 23 carrying a series of equally-spaced cups 24, the chains being carried on driving sprockets 25 mounted on a transverse shaft 26 supported above the hopper and guide sprockets 27, adjustably supported in brackets 28 fixed to the lower end of the hopper. The floor 29 of the hopper slopes downwardly towards the front end and terminates in two pockets 30 through which the chains 23 pass on their upward travel. As the chains move through the hopper each cup 24 picks up a potato and when the chains pass over the sprockets they enter metal tubes 31 which retain the potatoes upon the conveyors until the cups complete their downward travel. The tubes terminate immediately behind the drill opening shares 18 and slope rearwardly, preferably at an angle of about 17½° to the vertical, whereby the rearward ejection of the potatoes from the lower ends of the tubes counteracts the forward motion of the machine and so prevents the potatoes rolling from the positions in the furrows into which they are dropped.

As shown in Fig. 4 the cups 24 each consist of a substantially circular ring 32 formed integral with or fixed to a chain link and two struts 33 extending downwardly from the outer part of the ring to a lower portion of the same link thus forming a shallow pocket capable of accommodating any size potato but adapted to transfer only one potato at a time.

In order to avoid the possibility of oversize potatoes being carried into the tubes 31 and jamming the conveyors there is provided at the entry to each tube a knife blade 34 inset slightly from the outer edge of the tube, said blade being adapted to cut any oversize potato carried on the conveyors to a size which will ensure its free passage through the tube.

The conveyors are driven from one of the ground wheels 35 by a sprocket wheel 36 bolted to the ground wheel, a second sprocket wheel 37 loose on the shaft 26 and a driving chain 38, a hand operated dog clutch 39 being provided on the shaft 26 for transmitting the drive from the sprocket wheel 37 to said shaft. Preferably, the sprocket wheel 37 is removably mounted on the shaft 26 so that it may be interchanged with wheels of different sizes in order to vary the speed of the conveyors relative to the ground wheels and thus vary the spacing of the potatoes in the drills.

The conveyors constructed as above described will automatically plant small, large or cut potatoes without riddling. If desired, an operator or operators can sit upon the machine, for example, upon a seat or seats 40 at the rear of the hopper, to control the feed of potatoes to the conveyors and ensure that not more than one potato is carried by each cup in which case the planting is as accurate as hand planting.

As can be seen in Fig. 1, the hopper floor 29 is of slatted form, and this construction together with the open construction of the cups 24 prevents the accumulation of soil or other extraneous matter which might tend to interfere with the smooth running of the conveyors.

Mounted behind the potato hopper is a box 42 from which fertilizer or manure is distributed in the drills after the sown potatoes have been lightly covered with earth by the action of the skimming blades 19. The front wall 43 of the box slopes inwardly at its lower end but terminates short of the rear wall leaving a gap 44 through which the fertilizer, indicated at 45, falls on to a distributing device in the form of a rotary shaft 46 carrying two sets of rotors 47. These rotors carry the fertilizer over a lip 48 formed on the bottom portion of the box where it falls into chutes 49 which discharge the fertilizer into the drills. Also mounted in the box 42 is an agitating and feeding device comprising a rotary shaft 50 carrying a number of agitator blades 51 set at an oblique angle to the axis of the shaft in such manner as to assist the flow of fertilizer in the box towards the sets of rotors 47.

Preferably the front wall 43 of the box includes an adjustable panel 52 by which the width of the gap 44 may be varied to regulate the rate of discharge of the fertilizer.

The discharge of fertilizer can also be controlled by tilting the box to a greater or less extent. For this purpose bearings 46a supporting the ends of the shaft 46 are extended beyond the end walls of the box and are supported in or upon the side members 1 of the chassis, these bearings constituting the main support for the box. Attached to the rear wall of the box is a bracket arm 54 in which is pivotally mounted a block 55 bored to receive a vertically extending rod 56. The rod 56 is free to rotate within the block but an abutment 57 on the rod prevents axial movement of the rod through the block. The lower end of the rod is screw threaded for engagement with a nut or similar member 58 pivotally supported on the rear cross brace 3 of the chassis, as by pivots 58a as shown in Fig. 5a, and a hand wheel 59 is mounted on the upper end of the rod. Thus by manipulation of the hand wheel the bracket arm 54 is raised or lowered thereby tilting the box about the pivots constituted by the ends of the distributor shaft 46.

The shaft 46 is driven by chain and sprocket gearing 60, 61, 62 from the conveyor drive shaft 26 whilst the agitator shaft 50 is driven from the distributor shaft by further chain and sprocket gearing 63, 64, 65, preferably at a reduced speed.

It will be noted that by unscrewing the rod 56 and disconnecting the chain 61 the box can be lifted out of the machine thus facilitating cleaning or recharging.

The operation of the machine will be apparent from the above description. The machine having been coupled to a towing vehicle and set in motion, the hand lever 14 is operated to lower the banker frame to the desired position and the clutch 39 is moved to operative position to effect driving of the potato conveyors and the fertilizer distributor. As the shares 18 open the drills, potatoes are dropped therein at regularly spaced intervals and the skimming blades 19 then split back a part of the turned earth to provide a light covering over the turned potatoes. Thereafter a layer of fertilizer or manure is deposited in the drills and the covering or filling in of the drills finally completed by the blades 20.

The covering of the seed with a light layer of soil before adding the fertilizer ensures that the fertilizer is retained in the best position for feeding the upwardly sprouting seed so that by the use of the improved machine early and rapid development in the growth of the plants is obtained.

When it is desired to turn the machine, for example, when reaching the end of a furrow, the banker frame must be lifted by operation of the hand lever 14. Fig. 6 shows an alternative construction of machine wherein the hand lever 14 is moved to the front end of the machine, being mounted on the shaft 8 so that it is within reach of the operator seated in the machine. In addition, instead of driving the fertilizer distributor from the conveyor drive shaft, the drive is taken from the other ground wheel 35 by means of a sprocket wheel 65 bolted to said ground wheel and a chain 67. The sprocket wheel 62 is loosely mounted on the distributor shaft 46 and is adapted to be connected thereto by a hand operated dog clutch 68 similar in construction to the clutch 39. In all other respects the machine is constructed and operates in the same manner as that described with reference to Figs. 1–5.

If desired, the mounting of the furrow opening blades 18 may be adjustable for the purpose of varying the spacing between the drills. For example, the banker frame may include several selective points of attachment for the bars 6, interchangeable collars or spacing members 69 being mounted on the pivot pins 7. In Fig. 1 the range of adjustment of the bars is shown by the position indicated in dotted lines.

It should be understood that the arrangement of skimming blades 19 and drill closing blades 20 are given by way of example only and two or more skimming blades or light bankers may be used for each drill in combination with two or more blades for completing the closing of the drill.

I claim:

1. A machine for planting potatoes comprising a wheeled framework, a banker frame movable vertically in said framework, a share carried by said banker frame for opening a drill or furrow, mechanism for delivering potatoes to the drill, a skimming blade carried by said banker frame behind said opening share and mechanism for covering the sown seed with a light layer of soil, means carried by said framework behind said skimming blade for distributing fertilizer over said light layer of soil, said light layer of soil serving to protect the seed from direct contact with the fertilizer, a further blade carried by said banker frame behind said fertilizer distributing means for completely closing the drill after the fertilizer has been deposited, and means for driving said mechanism and fertilizer distributing means.

2. A machine according to claim 1, including a container for fertilizer, said container having an aperture at its lower end, and a rotary distributing device onto which the fertilizer falls from said aperture, and operative to discharge the fertilizer into the drill.

3. A machine according to claim 1, including a container for fertilizer having a discharge aperture at its base, a rotary agitating device mounted within said container and adapted to feed the fertilizer towards said aperture, and a distributing device mounted under said aperture.

4. A machine for planting potatoes, comprising a wheeled chassis, a banker frame mounted beneath said chassis, downwardly and rearwardly inclined bars at the front of the banker frame pivoted to said chassis, means for raising and lowering said banker frame relatively to said chassis, a pair of drill opening shares clamped to said inclined bars, a seed hopper, mechanism for transferring the potatoes from the hopper to the drills, light skimming blades carried on the banker frame and adapted to split back a portion of the turned earth over the sown potatoes, a container for fertilizer, a distributing device behind the skimming blades operative to deposit a layer of fertilizer fed from said container in each drill after the seed has been covered by the action of the skimming blades for protection against direct contact with the fertilizer, drill closing blades carried on the rear end of the banker frame behind said fertilizer distributing device, and means for driving the mechanism and the fertilizer distributing device.

WILLIAM THOMAS TEAGLE.